Dec. 22, 1964    G. C. CURRIE ET AL    3,162,099
MACHINE FOR SETTING UP EGG CARTONS AND THE LIKE
Filed Sept. 4, 1962    8 Sheets-Sheet 1

INVENTORS
GROVER C. CURRIE
J. ARTHUR COOK

BY Featherstonhaugh & Co.
ATTORNEYS

FIG. 4

INVENTORS
GROVER C. CURRIE
J. ARTHUR COOK

BY Featherstonhaugh & Co.
ATTORNEYS

Dec. 22, 1964    G. C. CURRIE ETAL    3,162,099
MACHINE FOR SETTING UP EGG CARTONS AND THE LIKE
Filed Sept. 4, 1962    8 Sheets-Sheet 3

INVENTORS
GROVER C. CURRIE
J. ARTHUR COOK

BY~ *Featherstonhaugh & Co!*
ATTORNEYS

Dec. 22, 1964  G. C. CURRIE ETAL  3,162,099
MACHINE FOR SETTING UP EGG CARTONS AND THE LIKE
Filed Sept. 4, 1962  8 Sheets-Sheet 4

INVENTORS
GROVER C. CURRIE
J. ARTHUR COOK
ATTORNEYS

Dec. 22, 1964 G. C. CURRIE ETAL 3,162,099
MACHINE FOR SETTING UP EGG CARTONS AND THE LIKE
Filed Sept. 4, 1962 8 Sheets-Sheet 5

FIG. 12

INVENTORS
GROVER C. CURRIE
J. ARTHUR COOK

BY *Featherstonhaugh & Co!*
ATTORNEYS

Dec. 22, 1964  G. C. CURRIE ETAL  3,162,099
MACHINE FOR SETTING UP EGG CARTONS AND THE LIKE
Filed Sept. 4, 1962  8 Sheets-Sheet 6

FIG. 13

INVENTORS
GROVER C. CURRIE
J. ARTHUR COOK

BY Fetherstonhaugh & Co.
ATTORNEYS

FIG. 14

Dec. 22, 1964  G. C. CURRIE ETAL  3,162,099
MACHINE FOR SETTING UP EGG CARTONS AND THE LIKE
Filed Sept. 4, 1962  8 Sheets-Sheet 8

FIG. 15

INVENTORS
GROVER C. CURRIE
J. ARTHUR COOK

BY Fetherstonhaugh & Co.
ATTORNEYS

United States Patent Office 3,162,099
Patented Dec. 22, 1964

3,162,099
MACHINE FOR SETTING UP EGG CARTONS
AND THE LIKE
Grover C. Currie, Charlotte, N.C., and Joseph Arthur Cook, London, Ontario, Canada, assignors to Somerville Industries Limited, London, Ontario, Canada
Filed Sept. 4, 1962, Ser. No. 221,260
5 Claims. (Cl. 93—37)

This invention relates to the manufacture and use of paperboard cartons and particularly relates to an apparatus for setting up egg cartons.

The invention is specifically concerned with the knockdown type of egg carton which is commonly used in the retail merchandising of eggs to the general public. This type of carton is formed of light paperboard and consists of a main blank capable of being folded to provide bottom, side and top walls in the set up carton. It further includes a number of partitions carried in slots in the center portion of the main blank. After the carton is set up, the partitions extend transversely of the carton to form the egg receiving pockets. These cartons are normally supplied to egg graders and packers in the knocked down form whereby to reduce bulk in shipping and storage. The packers set up the cartons by hand as they are required even though there are machines available which are capable of performing the setting up operation. These machines are of such high cost that they are not normally used by the average egg packer. Further, these known machines are highly inefficient in terms of the relatively high percentage of cartons which are torn or otherwise mutilated by their erratic operation. It is usual, therefore, for the packer to set up the cartons by hand, which is a time consuming and expensive process. Accordingly, the need for a relatively inexpensive, compact, efficient and fast operating machine for setting up egg cartons has long been felt. It is the primary object of this invention to provide such a machine.

It is a more specific object of the invention to provide a machine for setting up egg cartons which essentially consists of an arrangement of suction cups adapted to grip the carton blanks, spread them open and by means of a plunger mechanism, effect locking of the partition members with the side walls of the cartons whereby the blanks are set up.

The invention will be more fully understood from the following description of two preferred embodiments, as read with reference to the accompanying drawings.

Figure 1:
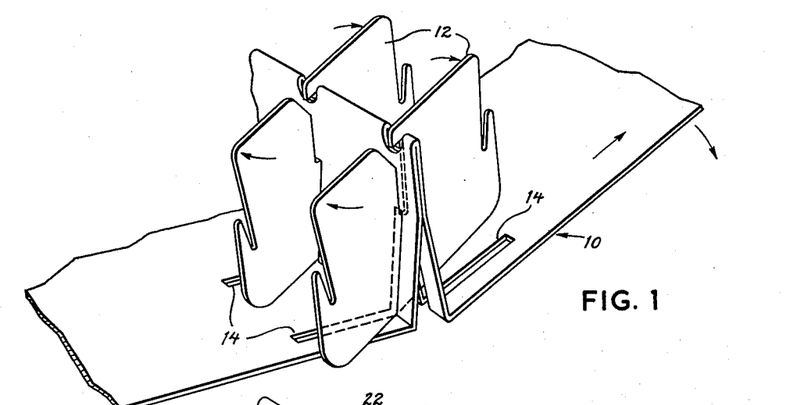
FIGURES 1, 2 and 3 are perspective views of a portion of an egg carton showing three steps in the setting up operation.
Figures 2, 3:
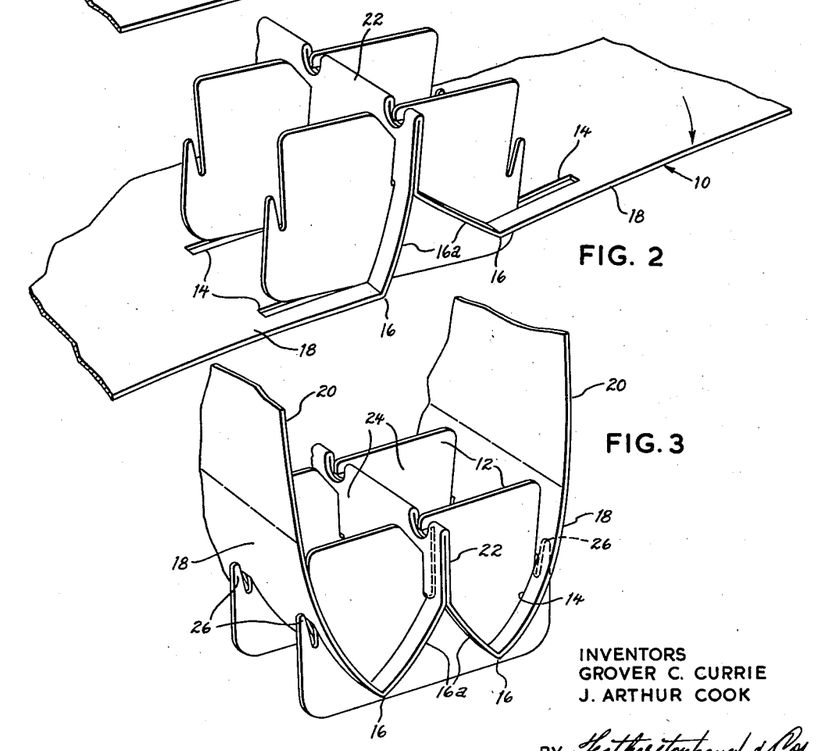

The egg carton which the machine in accord with this invention is particularly adapted to set up is illustrated in FIGURES 1 to 3 inclusive. It consists of a main blank 10 and a plurality of partition members 12 which are carried in slots 14 formed in the center region of blank 10. The combination of main blank 10 and the partition members 12 is hereafter referred to as the "Carton blank," and simply means an egg carton in the knocked down form. In the set up carton, blank 10 forms the bottom portions 16, the side wall portions 18 and the top flap portions 20. A central longitudinal partition member 22 runs longitudinally of the carton and is formed of a fold of blank 10. Central partition 22, bottom portions 16, and side wall portions 18, together with the partitions 12, define a plurality of egg receiving pockets 24 when the carton is set up. As is well known, this type of carton is usually designed to hold a dozen eggs.

FIGURES 1 to 3 illustrate several stages in the setting up operation. It will be appreciated that when the carton blanks are shipped and stored prior to setting up, they are in a folded condition with the partition members in the slots 14 but lying in an overlapping array between the side wall portions of the blank. As a carton blank is unfolded and laterally stretched, the partition members automatically assume the transverse position shown in FIGURES 2 and 3. FIGURE 1 illustrates the partition members in the process of reaching this final transverse position. This movement of the partition members to the fully transverse position is actually effected by the spreading apart of the inside bottom forming portions 16a of the blank. To effect the final interlocking between partitions 24 and the side wall portions 18 of the blank, the latter must be folded upwardly and inwardly towards the partitions whereby the tab members 26 engage the upper ends of the slots 14. Alternatively, this interlocking of the partitions with the side walls can be described as taking place when the partition members are pressed downwardly and outwardly against the side walls. Since the machine in accord with this invention actually follows the last mentioned procedure, it will clarify the following description of the machine if this interlocking action is described as comprising an advancement of the partition members against side wall portions 18 of the blank.

Figure 4:
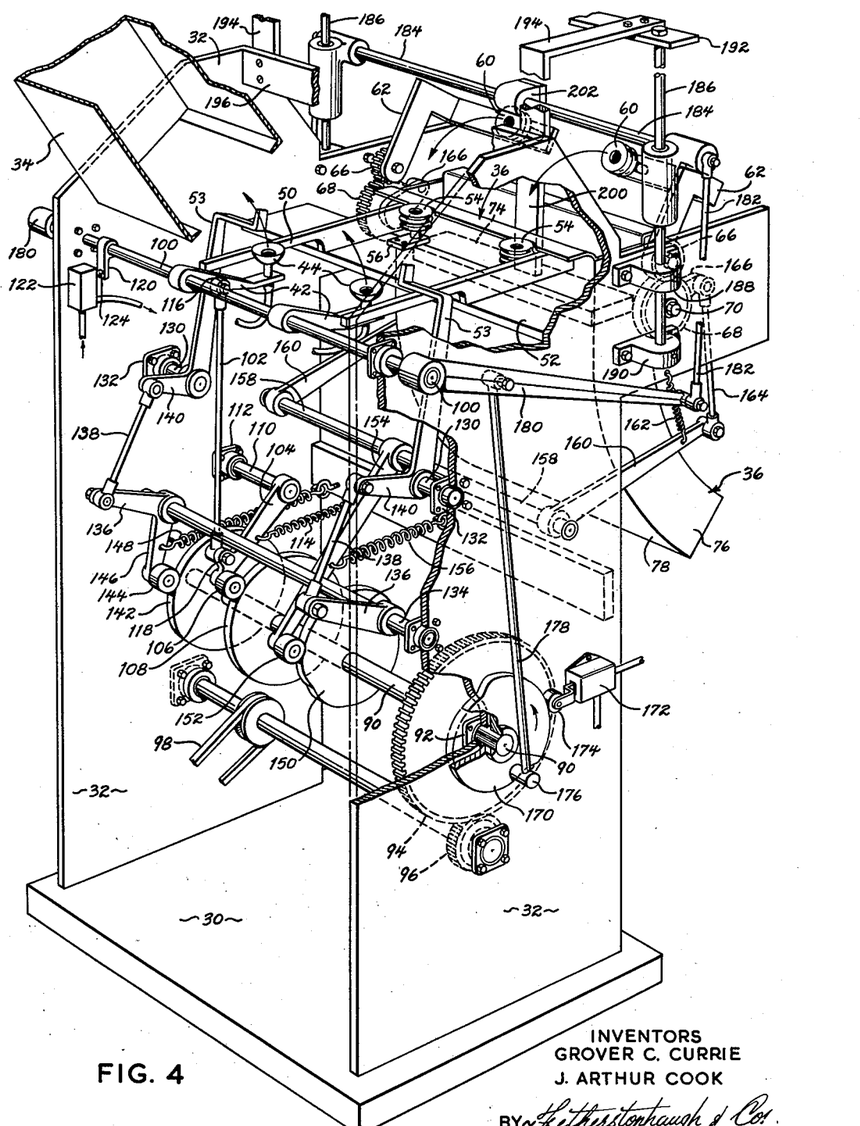
FIGURE 4 is a perspective view of the first embodiment of the machine in accord with the invention with the machine's outer casing being broken away to disclose its inner workings.

Referring now to FIGURE 4, the first embodiment of the machine in accord with this invention is illustrated in such a manner that the inner workings are clearly disclosed. The apparatus is supported on a base 30 carrying a pair of spaced side walls 32, the latter preferably formed of a suitable steel plate. A feeding mechanism 34 passes carton blanks in succession to the apparatus, and when they have been set up, they are delivered from the apparatus by a delivery mechanism 36. In order that the details of the apparatus illustrated in FIGURE 4 may be better understood, the operation of the essential components will be explained with reference to FIGURES 5 to 9 inclusive.

FIGURES 5 to 9 inclusive are all side elevation views, greatly simplified, of the upper portion of the machine illustrated in FIGURE 4.

Figure 5:
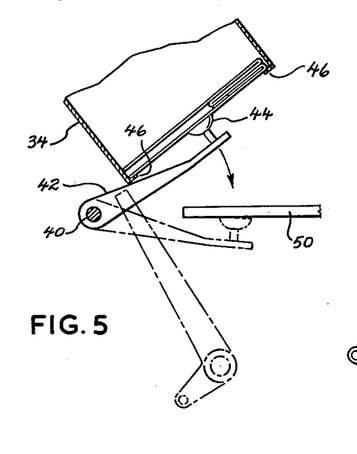
FIGURES 5 to 9 inclusive are a series of side views of the essential working components of the machine illustrated in FIGURE 4 whereby to illustrate the sequence of operation as a carton is set up.

FIGURE 5 illustrates the mechanism for receiving the carton blanks 10–12 from the delivery chute 34, and passing them on to the opening and setting up mechanism illustrated in FIGURES 6 to 9. Below and to one side of the exit of chute 34, there is a transverse shaft 40 carrying a pair of arms 42. Through a cam and tie-rod actuating mechanism which is illustrated in FIGURE 4, shaft 40 is caused to rotate so as to shift arms 42 between the two positions shown in FIGURE 5, one of the positions being indicated by dot and dash lines. At the free ends of arms 42 there are carried a pair of suction cups 44. The latter are connected by appropriate air hose means, which is not shown in FIGURE 5, to a source of vacuum pressure which is controlled to act at certain times only. Thus, vacuum cups 44 are adapted to grip blanks 10–12 and pull them away from their engagement with the flanges 46 at the exit of chute 34. It will be appreciated that chute 34 is constantly supplied with a plurality of blanks 10–12 so that the removal of the lowermost blank from engagement with flanges 46 will cause the next blank 10–12 to drop into the lowermost position on flanges 46. When arms 44 have been shifted to the dot-dash position, the vacuum pressure to cups 44 is cut off, whereupon the blank carried by the cups is released from engagement therewith and rests on the guide rails 50. The latter are supported, in turn, by a cross frame member 52, extending between the side wall members 32.

Figure 6:
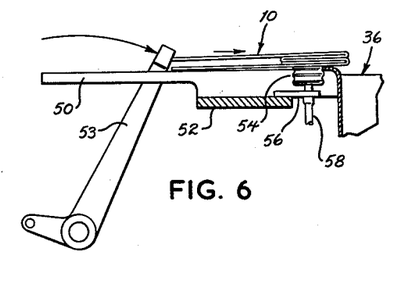

The next step in the sequence of operation is illustrated in FIGURE 6. A kicker arm 53 advances blank 10–12 along guide rails 50 to engagement with a second pair of suction cups 54. The latter are supported by brackets 56 carried by the same cross member which supports guide rails 50. Vacuum cups 54 are also connected to a source of vacuum pressure by tubing members 58. The vacuum pressure is continuous and is only cut off for a brief moment when the blank is to be released, as will be explained hereinafter. Thus, blank 10–12 when advanced along rails 50 by the kicker arm 53, is gripped by vacuum cups 54 immediately upon contact therewith.

The next step involves the closure of the movable vacuum cups 60 upon the upper face of blank 10–12 as the latter is held by the suction cups 54. Vacuum cups 60 are carried by a pair of pivotable arms 62 which are pivotally attached to side wall members 32 by a pair of appropriate axles 64. Spacing arms 62 from walls 34 and co-axially attached to axles 64, are a pair of gear members 66. The latter are geared to driving gears 68, which are also pivotally attached to walls 32 by axles 70. The rotation of gears 68 is effected through a series of linkages by the cam shaft as will be explained hereinafter. The vacuum pressure to cups 60 also is continuous with the exception of a short period of time when it is desired to release the blank from engagement therewith. Cups 60 are connected, by means of the hose 72, with the same source of vacuum pressure as are the other suction cups of the apparatus.

Figure 7:
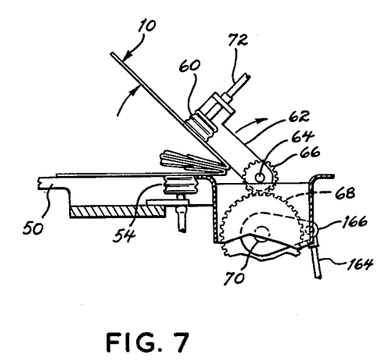

Immediately following engagement of cups 60 with the top surface of a blank 10–12, arms 62 are pivoted upwardly as to unfold the blank while at the same time causing the blank to stretch. FIGURE 7 illustrates this unfolding operation shortly after it starts.

Figure 8:
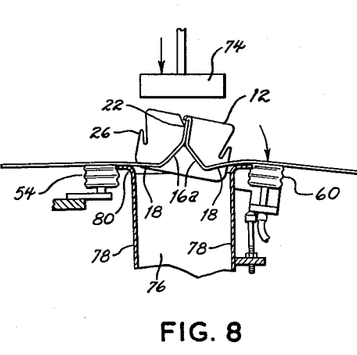

FIGURE 8 shows the blank fully spread open and stretched whereby the partitions 12 are oriented transversely to the central partition 22. With the blank held as shown in FIGURE 8, the plunger 74 is forced down on top of the partitions causing the tab members 26 to engage in the side wall slots by virtue of the upwardly and inwardly folding of the side walls 18. This folding of the side walls occurs as the blank is forced downwardly through the forming box consisting of the upper end of the outlet chute 36. More specifically, this forming box comprises the end wall members 76 and the side walls 78 which are preferably turned over as to present a rounded corner 80 to the side walls 18 of the blanks.

Figure 9:
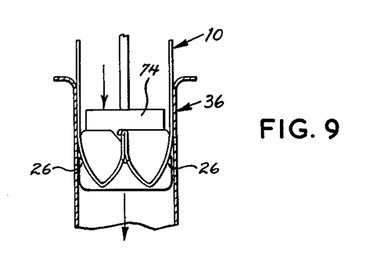

FIGURE 9 shows the final step in the setting up operation with the tabs 26 in engagement with the ends of the side wall slots 14. Plunger 74 forces the set up carton down the outlet chute 36 a sufficient distance to permit the next succeeding blank to be stretched out over the upper end of the chute.

As will be appreciated, the several steps in the above described setting up operation must be carried out in carefully prearranged sequence, and the correct timing of the several steps is important. The various movements of the working parts of the apparatus as well as the timing of such movements is controlled by a cam shaft 90. The latter is mounted for rotation in bearing members 92, carried by side walls 32. It is driven through intermeshed gears 94 and 96 and belt 98 connected to a power unit. The latter preferably comprises an electric motor and speed reducer combination.

The cams keyed to cam shaft 90 are each responsible for the control of one of the several setting up operations. They operate through followers and appropriate linkages to execute the several working movements described above with reference to FIGURES 5 to 9 inclusive. Thus, the arms 42 which carry the first suction cups 44 are keyed to a rotatable shaft 100, which is caused to rotate by the linkage 102, connected to the pivotable arm 104 carrying follower 106 which is biased against peripheral contact with cam 108. Arm 104 is supported for pivotal movement on the shortshaft 110 extending from the bearing unit 112 carried by one of the wall members 32. Arm 104 is biased towards cam 108 by the coil spring 114. Needless to say, linkage 102 is pivotally connected to one of the arms 42 and to arm 104 by means of bolts 116 and 118 respectively.

It will be noted that shaft 100 also carries a keyed detent member 120 which controls the vacuum pressure to the first suction cups 44 through the actuation of a vacuum switch 122. When arms 42 have reached their lowermost position as shown in FIGURE 4, detent 120 contacts button 124 whereby to shut off the vacuum pressure to suction cups 44 so that kicker arms 53 may advance the blanks off suction cups 44 on to suction cups 54.

Referring now to the actuation of kicker arms 53, it will be noted that these are individually mounted on short shafts 130, which are mounted for rotation in bearing members 132 carried by side walls 32. It will be appreciated, however, that arms 53 are adapted to move together, i.e., simultaneously. They are thus actuated through a common member, namely shaft 134 to which are keyed a pair of arms 136 connected through linkages 138 to the lower extents 140 of arms 53. Shaft 134 is rotated by means of cam 142 acting on the follower 144 carried at the free end of arm 146 which is keyed to shaft 134. Arm 146 is biased towards cam 142 by a spring 148.

The actuation of arms 62, which carry the vacuum cups 60, is accomplished through appropriate linkages from cam 150. The follower 152 carried at the free end of arm 154 is biased against cam 150 by spring 156. Arm 154 is keyed to a shaft 158 which is mounted for rotation in and extends between side walls 32. Keyed to shaft 158 at the extreme ends thereof are a pair of arms 160. The latter are biased upwardly by a pair of springs 162, only one of which can be seen in FIGURE 4. Pivotally attached to the free end of arms 160 are a pair of linkage members 164 which are in turn pivotally attached at the opposite ends to a pair of arms 166. As can be seen in FIGURE 7, as well as in FIGURE 4, arms 166 are keyed to axles 70 whereby the rocking of arms 166 causes rotation of gears 68 and 66 and pivoting of arm 62.

For controlling the supply of vacuum pressure to vacuum cups 54 and 60, a fourth cam 170 is keyed to one end of cam shaft 90 outside one of the walls 32. Cam 170 operates a vacuum switch 172 through the cam follow 174 whereby to shut off the vacuum pressure to vacuum cups 54 and 60 at the appropriate moments in the overall cycle as will be explained hereinafter. Cam 170 is also utilized to actuate the plunger 74. A pivotally mounted pin 176 is attached to cam 170 and carries a linkage 178 which is pivotally attached to arm 180. The latter is freely mounted on the outer end of shaft 100 outside the adjacent wall 32. As cam 170 rotates, arm 180 is caused to pivot about shaft 100. The outer free end of arm 180 pivotally carries another linkage 182 which is pivotally fixed, at its other end, to a cross bar 184. The latter is mounted for vertical reciprocation on a pair of upstanding rail-like rod 186 which are supported by a pair of brackets 188 and 190, fixed to the outside of wall 32. The upper ends of the rail-like rods 186 are further supported in a cross bar 192 which is supported, in turn, by a pair of brackets 194 fixed to another cross frame member 196 extending between side walls 32. Plunger 74 is fixed to bar 184 by the upright 200 through the member 202. Although the vertical reciprocation of the plunger 74 has been described as being actuated mainly through the action of cam 170, it is pointed out that a series of linkages, which is similar to the series consisting of pin 176, linkage 178, arm 180 and linkage 182, is arranged on the opposite side of the machine. In this case, however, the pin 176 is not carried on a cam such as cam 170 since only one of this type of cam is required. Therefore, the second pin 176 is carried at the outer end of a crank-like arm keyed to the opposite end of shaft 90, and, of course, outside wall 32.

Figure 10:
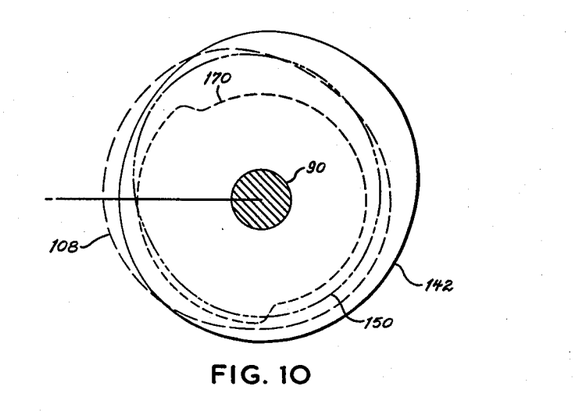
FIGURE 10 is a schematic side view of the cam shaft of the machine according to FIGURE 4.

To illustrate the relative positioning of the four cams 108, 142, 150 and 170 on cam shaft 90, reference will be made to FIGURE 10, where these cams are pictured as viewed from the left hand end of cam shaft 90, as viewed in FIGURE 4. Thus, the cam 142 is pictured in solid line, the other cams in dotted lines.

Figure 11:
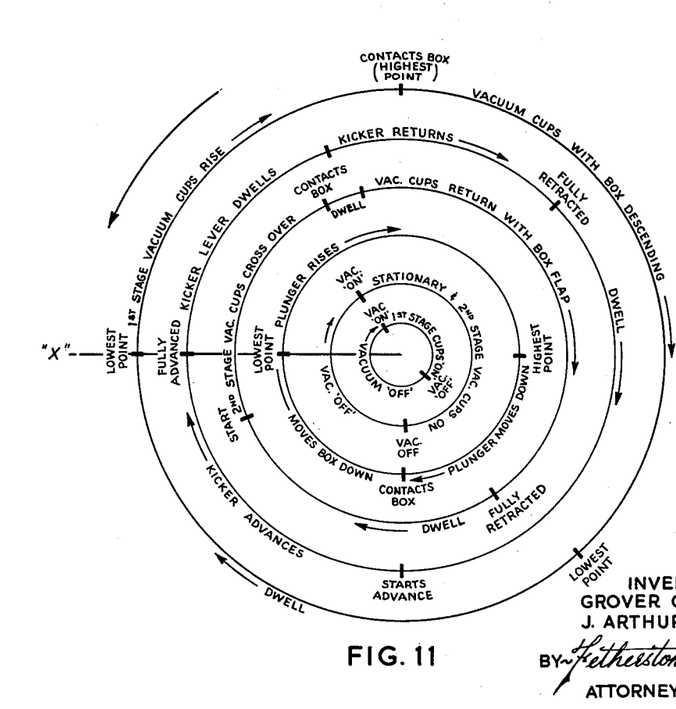
FIGURE 11 is a phase diagram to illustrate the various working components of the machine according to FIGURE 4 as they move through a full cycle in setting up a carton.

FIGURE 11 is a phase diagram to precisely position the several operating steps in their proper relation to each of the other steps. In this diagram, the innermost circle illustrates the timing of the actuation of vacuum switch 122 controlling the vacuum pressure to the first pair of vacuum cups 44. It will be seen that for approximately one half the total time required for the full box setting up operation, the vacuum pressure to cups 144 is on. This is obviously the length of time required for the cups 44 to pick up a carton blank from feed chute 34 and deliver it to the rail members 50, i.e., into position for advancement forward on to the second stage vacuum cups 54 by the kicker arms 53.

The next outer circle illustrates the operating cycle of vacuum switch 172. Progressing outwardly, the next four circles illustrate respectively the timing of the operation of (a) plunger 74 (through cam 170, linkages 178, 180 and 182 and 184), (b) arms 62 carrying vacuum cups 60, (c) kicker arms 53, and (d) the movements of arms 42 carrying vacuum cups 44.

To illustrate the use of the phase diagram shown in FIGURE 11, one can visualize the position of each of the operating members of the machine at the particular time represented by the dot and dash line "X." Thus, progressing from the inside circle outwardly, it will be seen that at this particular moment the vacuum pressure to the first stage vacuum cups 44 is off, the vacuum pressure to the second and third stage vacuum cups 54 and 60 is off, the plunger 74 has reached its lowest point and is beginning to rise, the second stage vacuum cups 54 have started to cross over to contact the top surface of a blank held on vacuum cups 54, the kicker arms 53 have been fully advanced forward whereby they have delivered a blank to vacuum cups 54 and are beginning a rest period in this advanced position and arms 42 carrying vacuum cups 44 are beginning to rise, having rested in their lowermost position for some time after having delivered a blank on to rails 50, which blank has in the meantime been delivered on to vacuum cups 54. It will be appreciated that the various positions of the working members as positioned at the moment "X" are the identical positions of these members as illustrated in FIGURE 4.

The second embodiment of the invention differs from the embodiment described above primarily in the manner of actuation of the various blank handling devices. Thus, the second embodiment is similar to the first in the essential components i.e., the carton blanks are spread open and stretched by means of vacuum cups devices and the final step is effected by a plunger.

Figure 12:
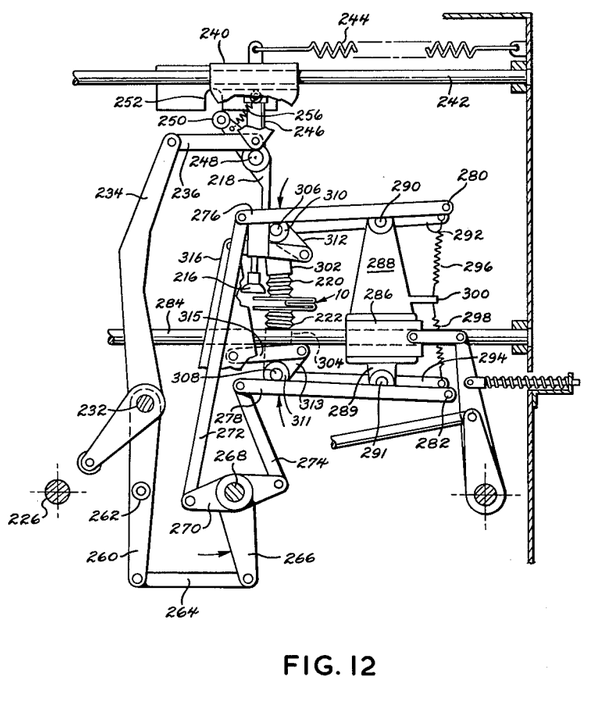
FIGURE 12 is a side elevation view of a second embodiment of the machine in accord with this invention, only the essential working parts being illustrated.
Figure 13:
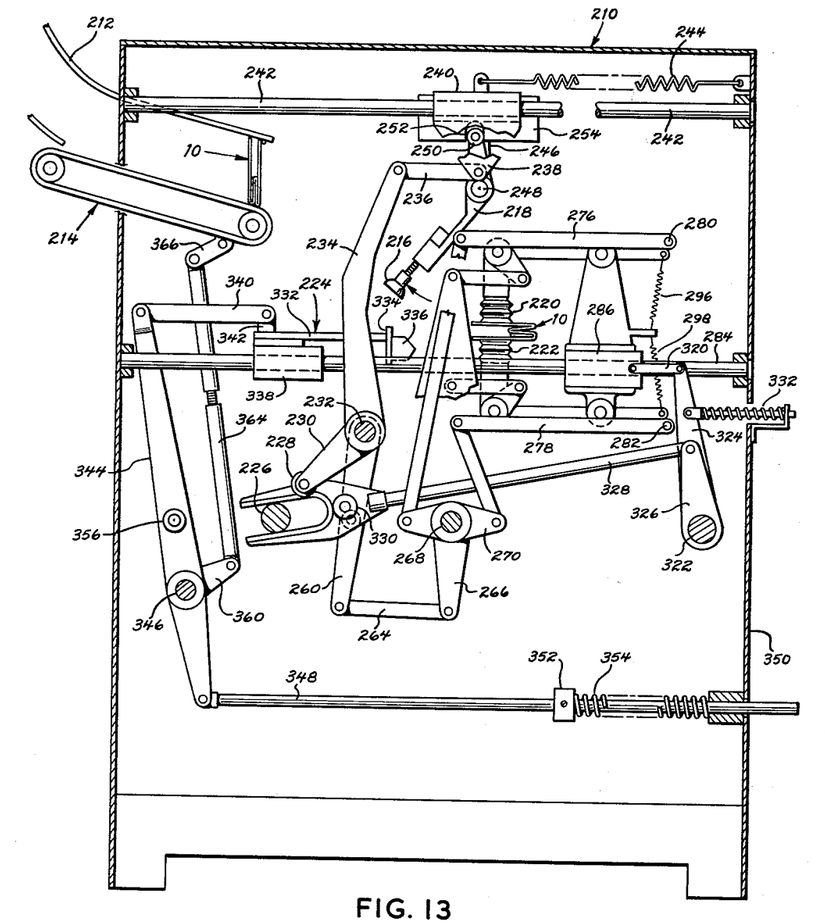
FIGURES 13 and 14 are similar to FIGURE 12 and illustrate two later phases in the setting up operation of the FIGURE 12 embodiment of the invention.
Figure 14:
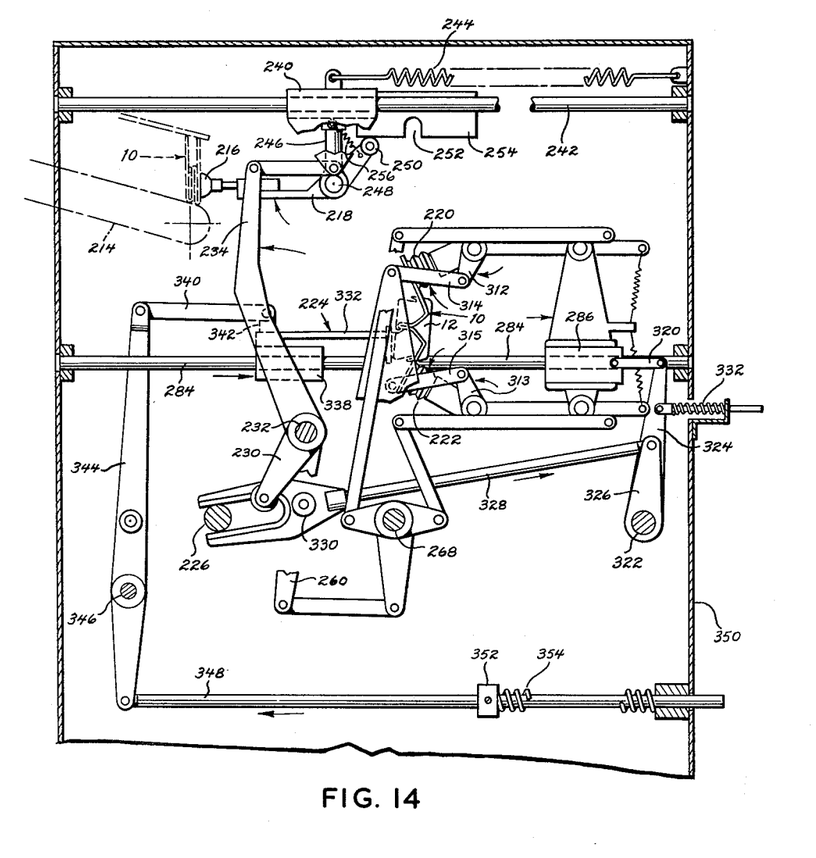

FIGURES 12 to 14 inclusive are side elevation views of the second embodiment of the invention but the drawings have been simplified somewhat in the interests of clarity.

Referring first to FIGURE 13, the machine is contained in an outer frame 210. A delivery chute 212 feeds carton blanks 10–12 to the machine, the feeding operation being assisted by an endless track device generally indicated by the reference numeral 214. As will be fully explained hereinafter, blanks 10–12 are taken from chute 212 and delivered to a position between the two pairs of vacuum cups 220 and 222, by the vacuum cup 216 carried at the lower end of a pivotable lever 218. The cups 220 and 222 spread open and stretch the blanks for the final setting up operations by the plunger 224. The set up cartons are then passed out through a delivery chute which is comparable to member 76 of the first embodiment of the apparatus, but oriented horizontally instead of vertically.

The actuation of the above referred to essential components of the second embodiment of the invention is also controlled by a system of linkages operating from a cam shaft. The latter bears the reference numeral 226, but it is not shown in detail as it is comparable to the cam shaft illustrated in the first embodiment of the invention.

The movements of lever 218 are effected through a follower 228 bearing against an appropriately shaped cam and carried at the lower end of arm 230 which is keyed to a transverse shaft 232 extending between side walls of the machine parallel to the cam shaft 226. Keyed to shaft 232, at either end thereof, are two identical upstanding arms 234 which rock back and forth as shaft 232 is rotated through the action of arm 230 and its associated cam follower 228. Arms 234 extend upwardly just inside the side walls of the machine to pivotal engagement with a pair of tie rods 236 which are pivoted at their other ends to bracket members 238. The latter are attached to a slider 240 which is adapted to slide back and forth on a pair of spaced rail members 242. Slide 140 is biased to the right, as seen in FIGURE 13, by a coil spring 244. Depending downwardly from slide 240 are a pair of arms 246 carrying at their lower ends a transverse shaft 248 extending between them. Mounted on shaft 248 for free rotation thereabout is the double arm lever 218 which carries vacuum cup 216 at its lower end. The upper end of lever 218 carries a follower 250 which is adapted to move in and out of a recess 252 in the fixed member 254. It will be seen that as slide 240 moves back and forth on rails 242, lever 218 automatically shifts between the two extreme positions shown in FIGURES 12 and 14 due to the manner in which follower 250 runs in and out of recess 252. Spring 256 constantly biases follower 250 upwardly whereby to urge it against the underneath side of the fixed member 254 and into recess 252 when the latter is encountered.

It will be appreciated that suction cup 216 transfers the blanks 10–12 from the mouth of the feeding mechanism 214 to a position between the suction cups 220 and 222. For this purpose, suction cup 216 is provided with an appropriate hose connection and vacuum hose leading to a source of vacuum pressure, as is the case with vacuum cups 44 of the first described embodiment of the invention.

Suction cups 220 and 222 are comparable to the cups 54 and 60 of the first embodiment of the invention. They differ from the latter in that they are both movable, whereas suction cup 54 is fixed. They function in the same manner, however, i.e., they spread open and stretch the blanks 10 for the final setting up operation by the plunger 224.

The actuation of suction cups 220 and 222 is also accomplished by a cam carried by cam shaft 226 and appropriate interconnecting linkages. To describe the actuation of cups 220 and 222, reference is made to FIGURE 12. It will be noted that this figure shows the apparatus at the point in the setting up cycle wherein a blank 10-12 has just been delivered to suction cups 220 and 222 by cup 216. The next steps in the cycle first stretch the blank to the degree shown in FIGURE 13 and then finally spread open the blank to the position shown in FIGURE 14. These several operations, as mentioned above, are controlled by a cam on cam shaft 226. Bearing against this cam is a follower 262, which is carried by an arm 260 which is freely mounted on shaft 232. Arm 260 is normally biased to the left (as seen in FIGURE 12) by a coil spring connected to the left hand end of the frame of the apparatus. The lower end of arm 260 is pivotally connected to a tie rod 264 which is in turn pivotally connected to arm 266, which is keyed to transverse shaft 268, which is mounted for rotation in the side-wall members of the frame of the machine. Keyed to this same transverse shaft 266 at opposite ends thereof are a pair of rocker arms 270. The left hand ends of rocker arms 270 are pivotally connected to tie rods 272 and the other ends to shorter tie rods 274. The upper ends of tie rods 272 and 274 are pivotally attached to lever members 276 and 278 respectively. These lever members are, in turn, pivotally attached at their other ends to the frame of the machine at points 280 and 282. As rocker arms 270 oscillate, the lever members 276 and 278 pivot about points 280 and 282 through small arcs. It will thus be seen that as rocker arms 270 pivot anti-clockwise as seen in FIGURES 12 and 14, lever members 276 and 278 are, in effect, pinched together. As is explained hereinafter, the purpose for this pinching action is to move the suction cups 220 and 222 in to initial contact with the opposite sides of a carton blank immediately after it is delivered between them by the suction cup 216.

The mechanism which carries suction cups 220 and 222 is capable of sliding movement on a pair of horizontal rail members 284. Only one of these rail members can be seen in FIGURES 12 to 14, but it will be appreciated that there are two of them running longitudinally of the machine adjacent the side walls of the frame. A pair of slide members 286 are mounted on rails 284 and carry vertical upwardly extending standards 288 and downwardly extending standards 289. A transverse shaft 290 is fixed to and extends between the upper ends of the vertical standards 288. A similar transverse shaft 291 extends between the downwardly extending standards 289. At this point is should be noted that lever members 276 and 278 are mounted closer to the side walls than are the standards 288 and 289, so that the shafts 290 and 291 do not interfere with the pivotal movement of members 276 and 278. Shaft 290 carries for pivotal movement a pair of arm members 292, and shaft 291 carries a pair of similar members 294. Arms 292 and 294 are biased by two pairs of springs 296 and 298, which are anchored to a pair of bracket members 300 carried by the standards 288.

At the opposite ends of arms 292 there is carried a pair of suction cup carrying members 302, to the lower ends of which are fixed the suction cups 220. A similar pair of suction cup carrying members 304 are pivotally carried at the opposite ends of arms 294. To be more accurate, members 302 are pivotally mounted on inwardly projecting shafts 306 and members 304 are likewise carried on similar shafts 308. A pair of collars 310 are also pivotally mounted on shafts 306 and are rigidly connected with members 302 whereby the rotation of collars 310 causes the rotation of members 302. Collars 310 are rotated by the arms 312 which are fixed thereto and extend downwardly therefrom and are pivotally connected with tie rods 314 at their lower ends, the opposite ends of tie rods 314 are pivotally connected with vertical standards 316 which are rigidly connected to the frame of the machine. A similar arrangement is employed on shafts 308. A pair of collars 311 are freely mounted on shafts 308 and are fixed to members 304 so that their rotation causes the rotation of members 304. Collars 311 are rotated by the arms 313 which are connected to the two tie rods 315, the latter being fixed to standards 316. It will thus be seen that as slides 286 move back and forth on rails 284, the vacuum cups supporting elements 302 and 304 are alternately opened and shut, i.e., pivoted on shafts 306 and 308.

It will be noted that FIGURES 12, 13 and 14 show three different positions of the vacuum cups 220 and 222. The position shown in FIGURE 12 is characterized in that the two cups are close together. This position is due to the reaction of lever members 276 and 278 on the shafts 306 and 308 thereby pivoting levers 292 and 294 about shafts 290 and 291 against the bias of the springs 296 and 298. The "pinching in" effect of the members 276 and 278 is, in turn, effected by the rocker arm 270, working through the tie rods 272 and 274.

The next position of cups 220 and 222 is shown in FIGURE 13. In this case, rocker arms 270 have pivoted on shaft 268 so as to spread apart lever members 276 and 278 thereby allowing the springs 296 and 298 to spread apart the cups 220 and 222.

The next position of cups 220 and 222 is shown in FIGURE 14 and in this case slides 286 have moved to the right whereby the restraining forces exerted on arms 312 and 313 by tie rods 314 and 315 causes the upwardly pivoting of cups 220 and the downwardly pivoting of cups 222, while the latter are simultaneously moved to the right. This has the overall effect on the blank of causing the blank to be spread open and stretched transversely of its longitudinal axis at the same time. The blank is thus worked into position for the final setting up operation wherein plunger 224 effects the final locking between the partition members and the side wall portions of the blank.

The manner in which slides 286 are moved on rails 284 is as follows: A pair of tie bars 320 (see FIGURE 13) pivotally link slides 286 and a transverse shaft 322 through a pair of lever members 324. The lower ends of the latter are keyed to shaft 322 which is mounted for rotation in the side walls of the machine in a pair of bearing members. Shaft 322 is rotated through a sufficient arc to cause the reciprocation of slides 286 on rails 284 by means of the lever 326 and tie rod 328. The latter is forked at its other end so as to be capable of freely reciprocating on cam shaft 226. This reciprocation is effected by one of the cams carried by shaft 226 through the follower 330. The latter is normally biased against this cam by the action of spring 332.

As mentioned above, the final setting up operation is affected by means of a plunger. In this second embodiment of the invention, the plunger operated horizontally as opposed to the vertical operation of the first embodiment plunger.

Plunger 224 consists of a horizontal plate 332 carrying a transverse vertical face member 334 on its forward edge. Member 334 carries a plurality of pocket formers 336 which are adapted to slide into the lower half of a blank 10-12 held between suction cups 220 and 222, as can best be seen in FIGURE 14. Plate 332 is fixed to and extends between a pair of slide members 338 adapted to move back and forth on rail members 284. The mechanisms which achieve this reciprocation of the plunger comprise a tie rod 240 pivotally attached to an upright 342 fixed to plate 332; a rocker arm 344 keyed to a transverse shaft 346, which is mounted for rotation in and extends between the side walls of the apparatus. The lower portion of rocker arm 344 is pivotally attached to a rod 348 which is capable of reciprocation through the forward wall 350 of the apparatus. Rod 348 carries an adjustable collar 352 and a compression spring 354 whereby it is biased to the left as seen in FIGURES 12 to 14. The upper portion of rocker arm 344 carries a cam follower 356 which is normally biased against a cam carried on cam shaft 226 by the action of the compression spring 354. This cam acts to alternately retract plunger 224 to the left and to allow it to quickly advance to the right under the compression of spring 354. Thus, the action of plunger 224 is one of quick forward advance and slow retraction.

The mechanism for operating conveyor 214 is as follows: An arm 360 is keyed to shaft 346 and is pivotally connected to the lower end of an adjustable tie rod 364. As shaft 346 rotates with rocker arm 344, arm 360 is caused to move through a like arc whereby tie rod 364 reciprocates up and down. The upper end of tie rod 364 is pivotally connected to a short arm 366 which is in turn connected to a ratchet mechanism (not shown) which operates conveyor 214 in a stop and go operation. Thus, as one blank 10–12 is removed from the conveyor mechanism by the suction cup 216, the next blank is advanced into the forward position.

Figure 15:
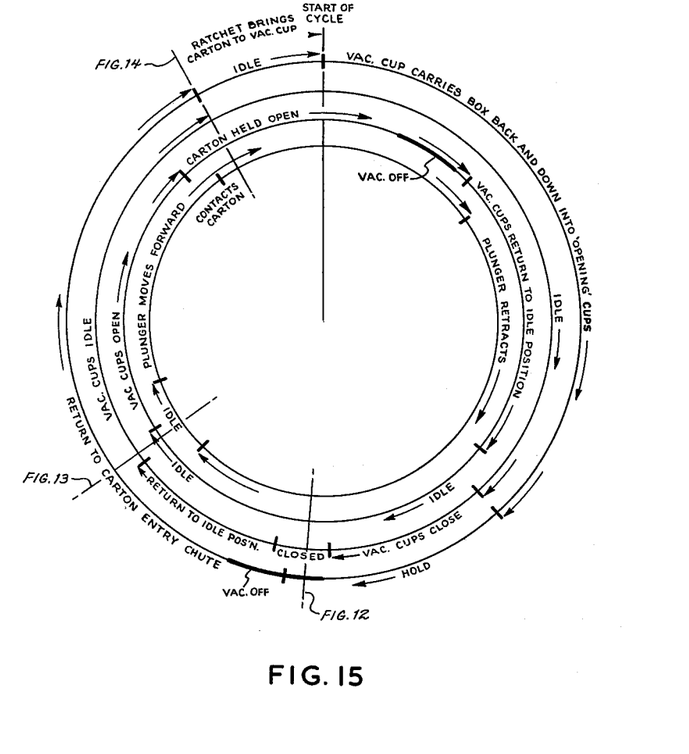
FIGURE 15 is a phase diagram similar to FIGURE 11 but applicable to the FIGURE 12 embodiment of the invention.

There are several elements of the second embodiment of the apparatus which are not shown in FIGURES 12 to 14. Such items as the motor means for turning the cam shaft and the vacuum switches for controlling the vacuum pressure to the various suction cups are similar to the like devices employed in the first embodiment of the invention and have not been illustrated for this reason. However, the sequence of operation of the second embodiment of the invention is illustrated by the phase diagram of FIGURE 15. Progressing outwardly from the center, the four circles depicted represent the operation of the plunger, the opening of vacuum cups 220 and 222, the closing of vacuum cups 220 and 222 and the feeding vacuum cup 216. The dotted lines bearing the connotation FIGURES 12, 13 and 14 show the relationship between the phase diagram 15 and the positions of the various components of the apparatus illustrated in FIGURES 12, 13 and 14. Phase diagram 15 can be used to visualize the relative position of each of the operating members of the second embodiment of the invention as FIGURE 11 is used with respect to the first embodiment of the invention.

Both embodiments of the invention are characterized in the use of vacuum cups to grip, spread open and stretch an egg carton blank to a position wherein a plunger mechanism may effect the final setting up operation by forcing the transverse partition members of the blank against the side walls to effect interlocking therebetween.

What we claim as our invention is:

1. An apparatus for setting up egg carton blanks, each of said blanks having a main blank part which carries a plurality of partition members in transverse slots in the center thereof and is folded over as to contain the partition members in overlapping relationship with one another and between those portions of the main blank which form the side walls of the set up carton, the said slots and partition members being located and sized to effect interlocking of said partition members with the said side wall portions of the blank as the blank is fully spread open and stretched in a direction paralleling said slots while said partition members are advanced against the side wall portion of the blank, said apparatus comprising a pair of said wall portion gripping devices, means for feeding folded blanks in succession to said gripping devices, actuating means for moving said gripping devices relative to each other whereby to simultaneously fully spread open and stretch a blank held between them, and plunger means for advancing the partition members of a spread and stretched blank against its side wall partitions whereby to interlock said partition members therewith whereby said carton is set up.

2. An apparatus as claimed in claim 1, in which said side wall portion gripping devices each comprise a pair of vacuum cups adapted to engage the outer surface of a side wall portion by suction one of said pairs of vacuum cups being fixed in position, the other pair being mounted for pivotable movement about a common axis from a first position directly opposing said first pair of vacuum cups to a second position spaced from said first pair of cups and facing generally in the same direction.

3. An apparatus for setting up egg carton blanks, each of said blanks having a main blank part which carries a plurality of partition members in transverse slots in the center thereof and is folded over as to contain the partition members in overlapping relationship with one another and between those portions of the main blank which form the side walls of the set up carton, the said slots and partition members being located and sized to effect interlocking of said partition members with the said side wall portions of the blank as the blank is fully spread open and stretched in a direction paralleling said slots while said partition members are advanced against the side wall portion of the blank, said apparatus comprising a frame, two pairs of vacuum cups carried within said frame and movable from a first position opposed to each other to a second position in which they are spaced from one another and facing generally in the same direction, a source of vacuum pressure, conduit means connecting said source of vacuum pressure to each of said vacuum cups, automatically operative switch means for controlling the operation of said source of vacuum pressure, means for feeding carton blanks in succession to said vacuum cups while the latter are in their said opposed position, whereby said cups grip, by suction means, the side wall portion of each blank in turn, means for moving said vacuum cups to said second position whereby to fully spread open each said blanks, and plunger means movable in a horizontal plane to force the partition members of each said spread open blanks against the side wall portions thereof whereby each said blank is set up.

4. The apparatus as claimed in claim 3, in which said means for feeding said carton blanks comprises chute means carried by said frame and adapted to deliver said blanks in succession to one or more pivotally mounted arm members carrying vacuum cups at their free ends, and control means for pivoting said pivotable arms from a first position at which said feeding arm vacuum cups pickup said blanks from said chute, to a second position at which said feeding arm vacuum cups deposit said blanks between said two pairs of vacuum cups, and automatically operative switch means for controlling the vacuum pressure to said feeding arm vacuum cups.

5. An apparatus for setting up egg carton blanks, each of said blanks having a main blank part which carries a plurality of partition members in transverse slots in the center thereof and is folded over as to contain the partition members in overlapping relationship with one another and between those portions of the main blank which form the side walls of the set up carton, the said slots and partition members being located and sized to effect interlocking of said partition members with the said side wall portions of the blank as the blank is fully spread open and stretched in a direction paralleling said slots while said partition members are advanced against the side wall portion of the blank, said apparatus comprising a frame, two opposed pairs of pivotally mounted vacuum cup units, means for feeding carton blanks in succession between said opposed pairs of vacuum cup units, said feeding means consisting of a pivotally mounted arm carrying a vacuum cup at its free end and chute means adapted to deliver carton blanks in succession to said last mentioned vacuum cup, and control means for actuating said chute and said last mentioned vacuum cup whereby to cause said blanks to be fed in succession to a position between said opposed pairs of vacuum cups with the side wall portions of said blanks facing said opposed pairs of vacuum cups, cam actuated linkage means for pivoting said opposed pairs of vacuum cups for fully spreading open said blanks held therebetween, and plunger means mounted for reciprocation in a plane substantially at right angles to the plane defined by the spread open blank, and cam operated linkage means for advancing said plunger means along said first mentioned plane as to force the partition members of said spread open blank against the side wall portion thereof as to set up said cartons.

References Cited in the file of this patent

UNITED STATES PATENTS

| | | |
|---|---|---|
| 2,387,274 | Lee | Oct. 23, 1945 |
| 2,699,711 | Mobley | Jan. 18, 1955 |
| 2,780,148 | Pearson et al. | Feb. 5, 1957 |
| 2,782,695 | Meissner et al. | Feb. 26, 1957 |
| 2,826,967 | Hatcher | Mar. 18, 1958 |
| 3,049,060 | Vahle | Aug. 14, 1962 |
| 3,062,106 | Pearson et al. | Nov. 6, 1962 |